United States Patent [19]

Mysels

[11] 4,164,382

[45] Aug. 14, 1979

[54] WIND DRIVEN POWER APPARATUS

[75] Inventor: Karol J. Mysels, LaJolla, Calif.

[73] Assignee: General Atomic Company, San Diego, Calif.

[21] Appl. No.: 819,363

[22] Filed: Jul. 27, 1977

[51] Int. Cl.² .............................................. F01D 1/08
[52] U.S. Cl. ........................................ 415/2; 290/44; 290/55
[58] Field of Search ...................................... 415/2–4; 290/44, 55

[56] References Cited

U.S. PATENT DOCUMENTS

| | | | |
|---|---|---|---|
| 1,002,833 | 9/1911 | Giddings | 415/2 |
| 1,595,578 | 8/1926 | Soverign | 415/2 |
| 1,663,943 | 3/1928 | Hays | 415/2 |
| 3,994,621 | 11/1976 | Bogie | 415/2 |
| 4,018,543 | 4/1977 | Carson et al. | 415/2 |
| 4,076,448 | 2/1978 | Sanders | 415/2 |

FOREIGN PATENT DOCUMENTS

| | | | |
|---|---|---|---|
| 249011 | 3/1926 | United Kingdom | 415/2 |
| 408049 | 4/1974 | U.S.S.R. | 415/2 |

Primary Examiner—C. J. Husar
Attorney, Agent, or Firm—Fitch, Even & Tabin

[57] ABSTRACT

A wind driven power apparatus for converting wind to mechanical energy is disclosed which includes a fixed axis turbine supported centrally of a fixed air guide defining a plurality of horizontal air passages disposed circumferentially of the turbine and each being adapted to receive an air stream therein coming from a limited range of wind directions and effect accelerated air flow toward the turbine. In one embodiment, an air guide block is disposed circumferentially of the turbine and is rotatable about the axis of the turbine to direct accelerated air flow to the turbine from the windwardly facing ones of the air passages, while in alternative embodiments means are provided for selectively closing off the air passages so that accelerated air flow from selected air passages is directed to the turbine.

24 Claims, 6 Drawing Figures

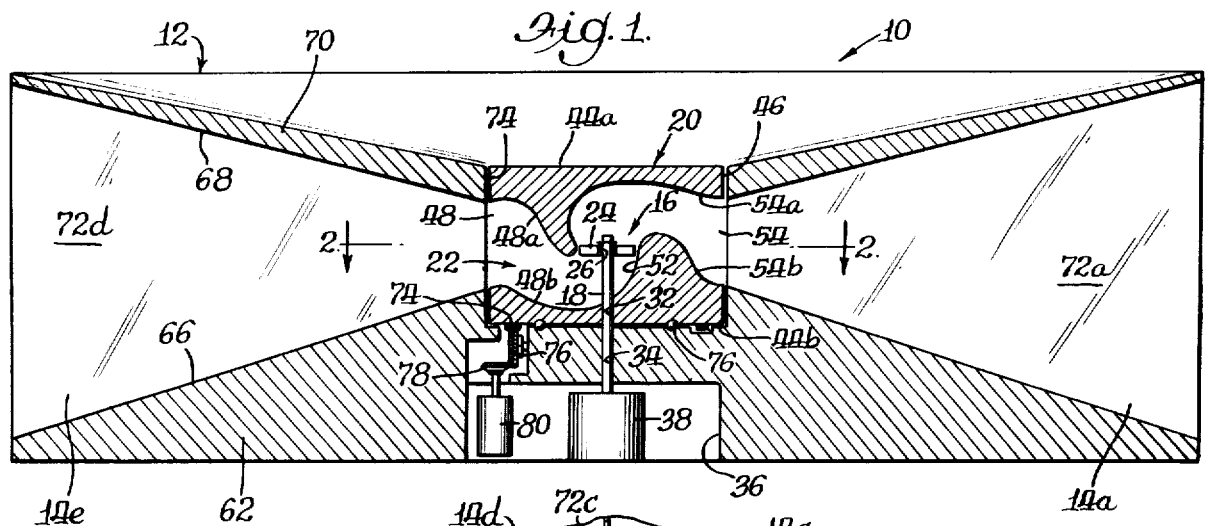
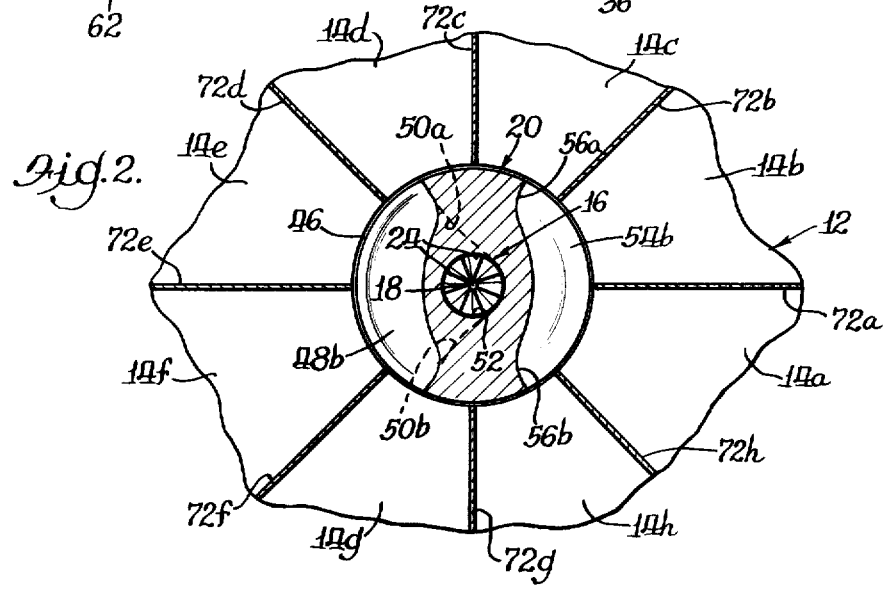
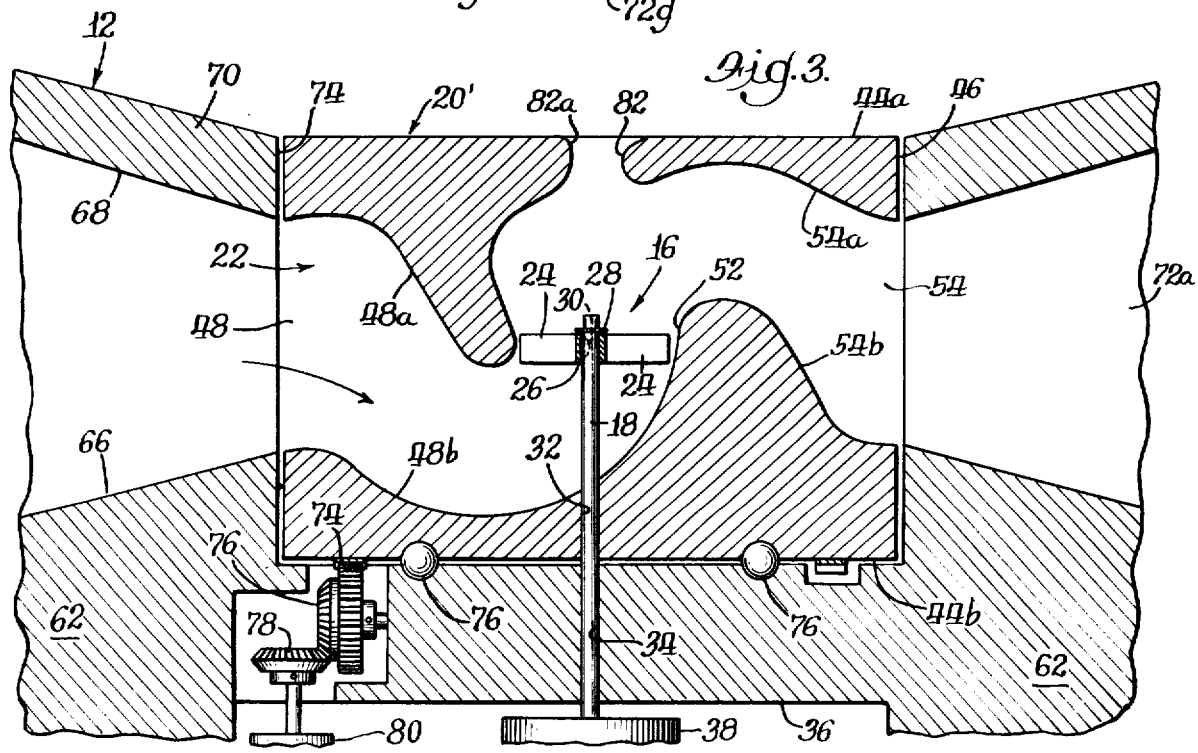

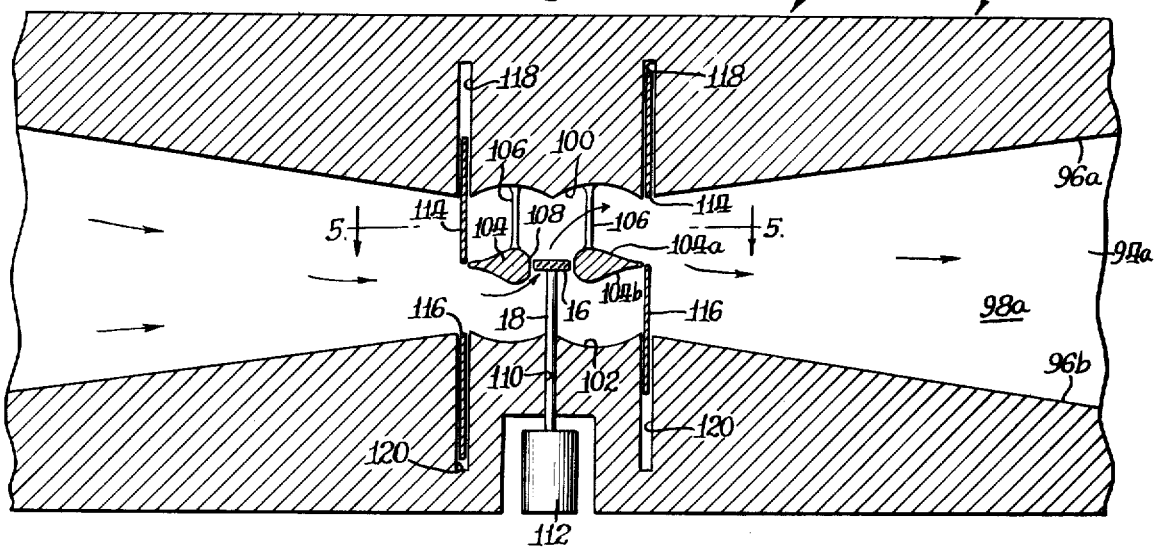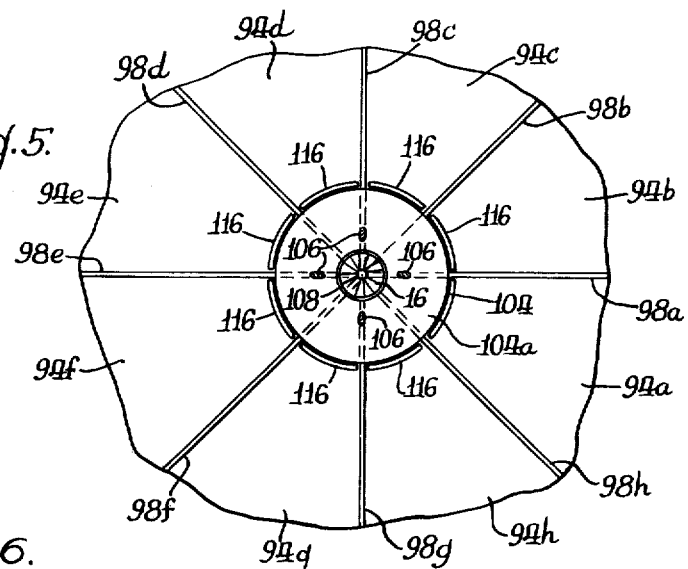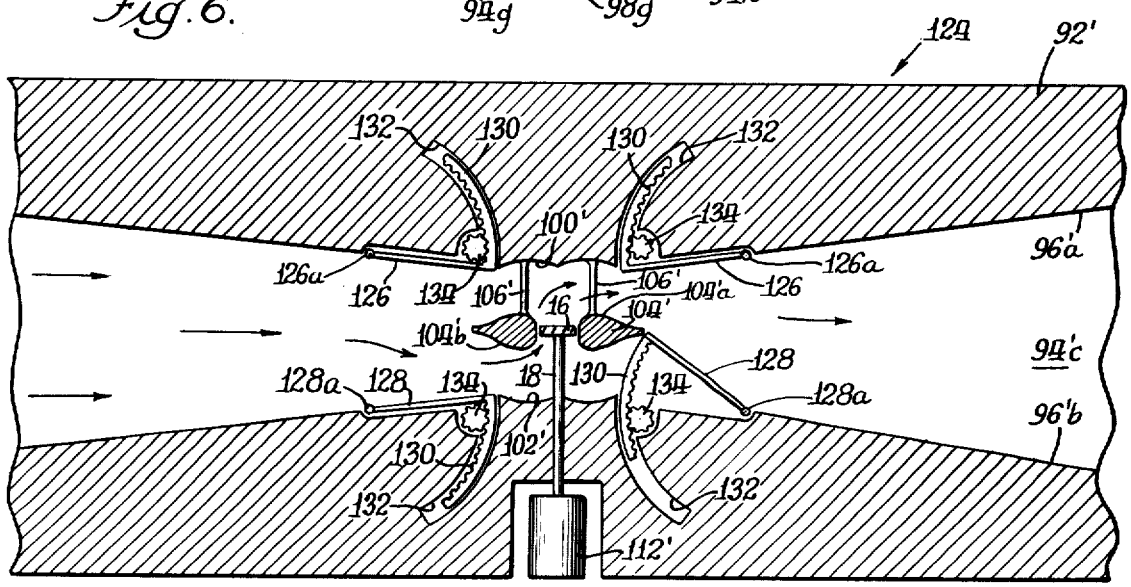

WIND DRIVEN POWER APPARATUS

The present invention relates generally to wind motors, and more particularly to a novel wind driven power apparatus which eliminates gyroscopic force problems through the employment of a fixed axis, rotatable, wind driven power turbine mounted on a turbine shaft centrally of a fixed air guide defining a plurality of air passages each of which is adapted to receive an air stream from a limited range of wind directions, and including means to direct accelerated air streams to the turbine from selected ones of the air passages.

Wind motors are known which employ generally horizontal air entrance nozzles through which air passes and is accelerated for impingement with a turbine rotatable on a turbine shaft from which power may be taken. See, for example, U.S. Pat. Nos. 757,800 and 1,002,833 and French Pat. No. 559,239. A significant drawback in the wind driven motors disclosed in these patents lies in the fact that the air entrance nozzles are quite massive and must be rotated to position the air passage in the windward direction. Due to the mass of the air entrance nozzles, a relatively complex and expensive support structure is required to support the air entrance nozzles for rotation.

A variation in prior wind driven power motors or generators is to employ a relatively stationary wind guide having horizontal air channels formed circumferentially about a central rotatable turbine having vertical turbine blades or buckets impinged by horizontal air streams from the air channels. See, for example, U.S. Pat. Nos. 789,993 and 3,938,907. In the devices of these patents, each increment of air flowing from the air channels impinges only a small percentage of the turbine blades so that relatively large turbine blades must be employed to obtain a significant power output from the turbine shaft.

One of the primary objects of the present invention is to provide a novel wind driven power apparatus which eliminates gyroscopic force problems and facilitates a substantially simpler construction than has heretofore been possible for a comparable power output.

Another object of the present invention is to provide a novel wind driven power apparatus which overcomes the disadvantages in the known prior art wind driven motors and generators through the provision of a relatively large stationary outer air guide defining a plurality of horizontal air intake channels disposed circumferentially of a fixed axis rotatable turbine and adapted to accelerate air streams passing therethrough and direct the air streams toward the turbine, with means being provided to direct accelerated air streams to the turbine from selected ones of the air passages.

A feature of one embodiment of the present invention lies in the provision of an inner air guide block disposed circumferentially about the fixed axis turbine and rotatable about the axis of the turbine, the inner air guide block having an air passage therethrough selectively registrable with selected ones of the air passages in the fixed outer air guide to receive air therefrom and effect further acceleration of the air as it impinges the rotatable turbine whereafter the spent air is directed to downstream air passages in the outer air guide.

A feature of another embodiment of the invention lies in the provision of a fixed axis rotatable turbine disposed centrally of a relatively large outer air guide defining a plurality of horizontal air passages disposed circumferentially of the turbine, with movable vane means being provided to close off selected portions of the air passages so as to direct accelerated air flow through the turbine.

A further feature of one embodiment of the invention lies in the provision of an auxiliary air exhaust opening in the air guide block to assist in the discharge of spent air after transferring energy to the turbine.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a longitudinal sectional view through a wind driven power apparatus constructed in accordance with the present invention;

FIG. 2 is an enlarged fragmentary sectional view taken substantially along the line 2—2 of FIG. 1, looking in the direction of the arrows;

FIG. 3 is an enlarged fragmentary longitudinal sectional view showing an alternative embodiment of the inner air guide block having a top exhaust opening therein;

FIG. 4 is a fragmentary longitudinal sectional view of a wind driven power apparatus constructed in accordance with an alternative embodiment of the present invention;

FIG. 5 is a fragmentary horizontal sectional view taken substantially along the line 5—5 of FIG. 4, looking in the direction of the arrows; and FIG. 6 is a fragmentary longitudinal sectional view similar to FIG. 4 but illustrating still another embodiment of a wind driven power apparatus in accordance with the present invention.

Referring now to the drawing, a wind driven power apparatus constructed in accordance with one embodiment of the present invention is indicated generally at 10 in FIG. 1. The wind driven power apparatus 10 may alternatively be termed a "wind mill", "wind motor" or "wind power generator" and is adapted to employ wind energy to drive a turbine and associated turbine shaft from which power may be taken either in the form of mechanical or electrical power.

Briefly, the wind driven power apparatus 10 includes an outer relatively large fixed air guide, indicated generally at 12, which defines a plurality of horizontal radial air passages or channels 14a–h each of which is adapted to receive an air stream coming from a limited range of directions relative to the air guide. The air passages 14a–h are operative to accelerate air flowing therethrough and direct the accelerated air flow toward the axis of the outer air guide 12 where the air is caused to impinge converter means in the form of a turbine converter, indicated generally at 16. The turbine converter 16, which may be termed the turbine, is supported for rotation in a substantially horizontal plane on a fixed axis turbine shaft 18 having its axis coincident with the axis of the outer air guide 12. In the embodiment illustrated in FIGS. 1-3, the outer air guide 12 and turbine 16 are operatively associated with means in the form of an inner air guide block, indicated generally at 20, adapted to direct air from selected ones of the air passages 14a–h to the turbine so as to effect rotation of the turbine and thereby convert the wind energy of the high velocity air streams to mechanical energy. AS will be described hereinbelow, the mechanical energy of the rotating turbine 16 may be readily converted to electrical energy in accordance with known techniques.

The inner air guide block 20 is supported by the outer stationary air guide 12 which extends peripherally of the inner air guide block so that the air passages 14a–h are disposed circumferetially about the full periphery of the air guide block 20 and extend generally radially from the axis of turbine 12.

The air guide block 20 has an air flow passage 22 therethrough and is adapted to be selectively rotated relative to the outer stationary air guide block 12 to position the entrance of the air flow passage 22 to receive high velocity air flow from a plurality of the windwardly facing ones of the air channels 14a–h. The air flow passage 22 is adapted to further accelerate air flowing through the air passage 22 and direct the air to the turbine 12 to rotate the turbine and turbine shaft 18 whereafter the spent air issuing from the turbine is directed by the exit end of the air passage 22 outwardly through the downwind facing ones of the air passages in the stationary air guide 12.

The turbine 16 may take any one of a number of known design configurations suitable for use as a wind driven turbine. In the illustrated embodiment, the turbine 16 includes a plurality of radial turbine blades 24 mounted on an annular hub 26 secured on the upper end of the turbine shaft 18 by a retainer ring 28 and fixed to the turbine shaft for rotation therewith by suitable means such as a key 30 (FIG. 3). The turbine blades 24 are suitably pitched so that relatively high velocity air flow through the air channels 14a–h and air passage 22 rotates the turbine and associated turbine shaft.

The turbine shaft 18 extends downwardly through suitable bores 32 and 34 in the inner air guide block 20 and outer air guide 12, respectively, the lower end of the turbine shaft being received within a chamber 36 in the outer stationary air guide and connected to a generator 38 to facilitate conversion of the wind energy to electrical power energy. Mechanical energy could similarly be taken from the turbine shaft 18 through a suitable gear arrangement or the like. Suitable sleeve bearings, not shown, may be provided in the bores 32 and 34 to provide bearing support for the turbine shaft.

The inner air guide block 20 has parallel upper and lower planar surfaces 44a and 44b, respectively, and a cylindrical outer peripheral surface 46. The air passage 22 is formed internally of the air guide block 20 and intersects the outer surface 46 to define an air or wind entrance 48 bounded on its upper periphery by a generally downwardly curved surface 48a and on its lower periphery by a downwardly and then upwardly curving surface 48b.

As best seen in FIG. 2, the surfaces 48a and 48b are blended smoothly together at their lateral boundaries by outwardly diverging surfaces 50a and 50b having sufficient spaced dimension at the surface 46 of the air guide block to facilitate entry of air or wind into the air entrance 48 from the inner ends of a plurality of the air flow channels 14a–h during operation, as will become more apparent hereinbelow.

The surfaces 48a, b and 50a, b defining the entrance 48 of the air passage 22 converge and blend with an intermediate portion 52 of the air passage, the intermediate air passage portion 52 being substantially circular in transverse section through the portion of the air guide block in which the turbine 16 is positioned so that the wall surface defining the air passage portion 52 encircles the turbine is closely spaced relation to its peripheral surface, as best seen in FIG. 2. The air passage 22 is substantially vertical at the intermediate portion 52 so that air passing from the air entrance 48 flows substantially vertically as it impinges the horizontally disposed turbine 16.

The air passage 22 includes an air exit portion 54 bounded on its upper periphery by a generally concave surface 54a and bounded on its lower periphery by a generally convex or downwardly curving surface 54b. The upper and lower boundary surfaces 54a and 54b of the air exit 54 merge with lateral boundary surfaces 56a and 56b, as best seen in FIG. 2, to define an outwardly diverging air exit passage which intersects the outer surface 46 of the inner air guide block so that spent air issuing from the turbine 16 is directed outwardly from the air guide block in a generally horizontal direction. The air exit passage 54 preferably has greater volume than the air entrance passage 48 to accommodate the reduced velocity of the airstream after giving up energy to the turbine 16.

In the illustrated embodiment, the stationary outer air guide 12 includes a circular base portion 62 which may be supported on a suitable support frame or foundation (not shown). The base portion 62 has a downwardly inclined frustoconical surface 66 which forms the lower boundary surfaces of the air channels 14a–h. The upper boundary surfaces of the air channels 14a–h are defined by an upwardly inclined frustoconical surface 68 formed on a dish-shaped upper element 70 supported above the base portion 62 by a plurality of vertical equidistantly spaced, radially directed vanes 72a–h so that the surfaces 66 and 68 are substantially symmetrical relative to a plane normal to the axis of the turbine shaft 18 and intermediate the surfaces 66 and 68. The frustoconical surfaces 66 and 68 cooperate with the vanes 72a–h to define converging air channels 14a–h so as to increase the velocity of air or wind flowing radially inwardly through the air channels facing in the windward direction.

As best seen in FIG. 1, the outer stationary air guide 12 has a central cylindrical recess 74 which receives the inner air guide block 20. The inner air guide block is supported on suitable bearings 76 for rotation about the axis of the turbine shaft 18. Means are provided to selectively rotate the inner air guide block 20 relative to the outer stationary air guide member 12 so as to position the air passage entrance 48 in the windward direction for receiving high velocity air flowing through the windwardly facing air channels. In the illustrated embodiment, the lower surface 44b of the inner air guide block 20 has an annular gear rack 78 cooperable with an idler gear 80 driven from a drive gear 82 mounted on the output shaft of a control motor 84. The control motor 84 is preferably connected in a servo circuit (not shown) responsive to the direction of the wind, such as through a suitable wind direction detector, to rotate the inner air guide block as necessary to orient the air entrance 48 in a windward direction. It will be understood that any suitable means may be employed to rotate the air guide block.

In operation, the velocity of the wind entering the windwardly facing ones of the air channels 14a–h is increased and enters the air entrance 48 of the air passage 22 in the inner air guide block 20. As mentioned, the air entrance 48 is configured to receive air from a plurality of the air channels 14a–h. The velocity of the air entering the air entrance 48 is further increased as the air flows through the converging air passage 22 to the intermediate portion 52 at which time the air stream assumes a generally vertical direction and impinges the turbine blades 24 of the turbine 16 to effect rotation of the turbine. Rotation of the turbine 16 rotates the turbine shaft 18 to operate the generator 38 and complete the transition of the wind energy to electrical energy. The spent air issuing from the turbine 16 is directed by the inner air guide block 20 into a substantially horizontal direction through the discharge passage 54 into a plurality of the downward facing ones of the air passages 14a–h.

By mounting the turbine 18 for rotation about a substantially vertical fixed axis, the rotational axis of the turbine need not be changed as wind direction changes, and gyroscopic forces are eliminated. Adjustment for a change in wind direction is made by rotating the relatively low mass inner air guide block 20 which undergoes no other movement, thereby further eliminating gyroscopic forces.

FIG. 3 illustrates an alternative embodiment of the wind driven power apparatus of the present invention, and employs an inner air guide block 20' having a top exhaust opening 82 formed in the upper surface 44a generally axially upwardly from the turbine shaft 18. The exhaust opening 82 may be of circular configuration and is optionally provided to increase the low pressure exhaust area for removal of spent air issuing from the turbine 16. The upper peripheral edge of the exhaust opening 82 is preferably rounded as at 82a to facilitate smooth air flow to the reduced pressure area overlying the air guide block.

FIGS. 4 and 5 illustrate an alternative embodiment of a wind driven power generating apparatus, indicated generally at 90, constructed in accordance with the present invention. The wind driven power apparatus 90 includes an outer stationary air guide 92 which defines a plurality of horizontal radial air passages indicated at 94a–h in FIG. 5. The radial air passages are bounded on their upper and lower surfaces by converging frusto-conical surfaces 96a and 96b, and are bounded at their lateral edges by equidistantly circumferentially spaced vertical vanes 98a–h similar to the aforedescribed vanes 72a–h.

The air passages 94a–h terminate at their radial inward ends in a central air chamber defined on its upper and lower boundaries by annular concave surfaces 100 and 102, respectively. A toroidal shaped air guide member 104 is suspended midway between the surfaces 100 and 102 by a plurality of suitable struts 106, there being four struts shown in FIG. 5. The toroidal air guide member 104 has aerodynamically shaped upper and lower surfaces 104a and 104b which terminate at their radial inner edges in a central opening 108 in which a turbine 16 is supported on a fixed axis turbine shaft 18, the lower end of the turbine passing through a bore 110 in the air guide 92 for connection to a suitable electric generator 112 or the like similar to the aforedescribed generator 38.

The wind driven power apparatus 90 includes means in the form of cooperating pairs of upper and lower vertically movable vanes or shutters 114 and 116, respectively, which are operatively associated with the air guide 92 and toroidal air guide member 104 in a manner to facilitate selective closing of the air passages 94a–h and thereby selectively direct air from the radial air passages to the turbine converter 16 to effect conversion of high velocity air flow to mechanical rotation of the turbine 16. The cooperating shutters 114 and 116 are substantially identical and are arcuate in transverse sectional configuration as considered in FIG. 5. Each shutter 114, 116 is received within a correspondingly shaped vertically disposed groove or slot 118 and 120, respectively, formed in the stationary air guide 92 between the radial vanes 98a–h. Means (not shown) are operatively associated with each of the upper and lower shutters 114 and 116 to selectively move them between positions fully retracted within their respective slots, and positions wherein their outer edges engage the radial outer edge of the toroidal air guide member 104 as best seen in FIG. 4.

In the operation of the wind driven power apparatus 90, the shutters 114 and 116 are selectively moved to positions wherein the upper shutters 114 associated with the air passages 94a–h facing in the windward direction are moved downwardly such that their lower edges engage the outer edge of the air guide member 104 while the corresponding lower shutters 116 remain retracted within their respective slots 120. Simultaneously, the lower shutters 116 associated with the downwind facing air passages 94a–h are moved upwardly to positions wherein their upper edges engage the associated outer edge of the toroidal air guide member, while the corresponding upper shutters remain retracted, as best seen in FIG. 4. With the shutters 114 and 116 so positioned, the velocity of the air streams flowing through the windwardly facing ones of the air passages 94a–h is increased and the increased velocity air is directed to and through the turbine 16 for effecting rotation thereof, whereafter the spent air from the turbine passes downstream from the turbine outwardly through the downstream facing ones of the fixed air passages 94a–h.

FIG. 6 illustrates still another embodiment of a wind driven power apparatus, indicated generally at 124, in accordance with the present invention. The wind driven power apparatus 124 is generally similar to the aforedescribed wind driven power apparatus 90 except that it employs pairs of cooperating upper and lower shutters 126 and 128, respectively, which are selectively movable to open or close the fixed air passages 94'a–h formed in an outer stationary air guide 92'. The shutters 126 and 128 are pivotally mounted about hinge axes 126a and 128a, respectively, on the upper and lower surfaces 96'a and 96'b defining the air passages 94'a–h so as to be movable between retracted positions lying generally flat against the respective surfaces 96'a and 96'b and extended positions spaced from the respective air passage surfaces 96'a and 96'b wherein the free inner edges of the shutters engage a toroidal air guide member 104' disposed circumferentially of a fixed axis turbine 16.

To effect movement of the upper and lower shutters 126 and 128, each of the shutters has an arcuate shaped rack 130 secured thereto adjacent its free edge, each rack being received within a suitable arcuate shaped slot 132 and having cooperation with a pinion gear 134 selectively rotatable by means (not shown) to effect movement of the associated shutter 126 and 128 between their respective open and closed positions. The shutters 126 and 128 are movable to selectively close off the air passages 94'a–h in the outer stationary air guide 92' in a manner similar to the operation of the aforedescribed shutters 116 so as to cause air streams passing through the windwardly facing ones of the air passages 94'a–h to impinge and rotate the turbine 16 for converting wind energy to mechanical rotation of the turbine.

Thus, in accordance with the present invention, a wind driven power apparatus is provided which employs a relatively large, stationary outer air guide defining a plurality of horizontal radial air passages or channels adapted to increase the velocity of air entering the windwardly facing air passages. Means are provided to direct air streams from selected of the radial air passages to a fixed aix rotatable turbine so as to effect conversion of the high velocity air streams to mechanical rotation of the turbine. In one embodiment, a relatively low mass inner air guide block is disposed centrally of the stationary radial air passages and is selectively rotatable to effect entry of air streams from the radial air passages into an air passage within the inner air guide block, the inner air passage being adapted to further increase the air flow velocity and direct the air vertically to impinge and rotate a fixed axis turbine. In alternative embodiments, shutters are selectively operable to close off selected of the outer radial air passages so as to direct increased velocity air streams from selected of the air passages to the turbine.

By employing an outer stationary omnidirectional wind guide and cooperating means to selectively direct high velocity air streams from horizontal air passages to and through a fixed axis turbine to effect rotation of the turbine, the problems of gyroscopic forces encountered with the known prior windmill power generators are eliminated. Because of its simplified construction, the wind driven power apparatus of the present invention is believed to provide significant economic advantages over the prior art devices.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. Apparatus for converting wind to mechanical energy comprising, in combination, fixed air guide means defining a plurality of outer air passages each of which is adapted to receive an air stream therein coming from a limited range of directions relative to said fixed air guide means, said air passages being adapted to increase the velocity of the air streams received therein and direct the increased velocity air streams to a predetermined location, converter means supported at said predetermined location for rotation about a fixed axis internally of said fixed air guide means, said converter means being adapted to receive said high velocity air streams from said outer air passages and convert said high velocity air to mechanical rotation, and means operatively associated with said fixed air guide means and adapted to selectively direct air from said outer air passages to said converter means so as to effect said conversion of high velocity air to mechanical rotation.

2. Apparatus as defined in claim 1 wherein said means adapted to selectively direct air from said outer air passages to said converter means comprises an inner air guide supported by said fixed air guide means for rotation about an axis coincident with said fixed axis, said inner air guide being adapted to receive increased velocity air from a selected and limited number of said outer air passages, said inner air guide means being adapted to direct said high velocity air streams to said converter means.

3. Apparatus as defined in claim 2 wherein said fixed air guide means defines a longitudinal axis generally centrally thereof, and wherein said rotational axis of said inner air guide coincides with said longitudinal axis of said fixed air guide means.

4. Apparatus as defined in claim 1 wherein said converter means comprises a turbine, and including means supporting said turbine for rotation about said fixed axis in a substantially horizontal plane.

5. Apparatus as defined in claim 2 wherein said fixed air guide means defines a plurality of substantially horizontal radial outer air passages disposed circumferentially about said turbine, said inner air guide being adapted to effect flow of high velocity air from said selected of said air passages to said turbine in a manner to effect rotation thereof.

6. Apparatus as defined in claim 2 wherein said inner air guide comprises a cylindrical air guide block having an inner air flow passage formed therein defining an air entrance and air exit intersecting the cylindrical peripheral surface thereof, said fixed air guide means being disposed circumferentially of said cylindrical surface with the inner ends of said outer air flow passages being closely adjacent said cylindrical surface.

7. Apparatus as defined in claim 6 including means operatively associated with said air guide block for selectively rotating said air guide block relative to said second air guide means.

8. Apparatus as defined in claim 6 wherein said inner air flow passage includes a generally vertically directed portion disposed intermediate said air entrance and air exit, said converter means comprising a substantially vertical rotatable turbine shaft coaxial with the axis of rotation of said air guide block and a turbine supported on said turbine shaft within said vertically directed portion of said inner air flow passage.

9. Apparatus as defined in claim 8 including power generator means driven by said turbine shaft.

10. Apparatus as defined in claim 8 wherein said inner air flow passage is adapted to increase the velocity of air entering said air entrance and passing to said turbine.

11. Apparatus as defined in claim 8 wherein said inner air flow passage downstream from said turbine has greater volume than the volume of said inner air flow passage from said air entrance to said turbine so as to accommodate the increased volume of reduced velocity air downstream from said turbine.

12. Apparatus as defined in claim 6 wherein said air entrance is adapted to simultaneously receive air flowing inwardly from a plurality of said outer air passages, said inner air flow passage being adapted to further increase the velocity of air received in said air entrance as said air passes to said converter means.

13. Apparatus as defined in claim 1 wherein said outer air passages comprise substantially horizontal radial air passages disposed circumferentially of said converter means, said means operatively associated with said fixed air guide means and adapted to selectively direct air from said outer air passages to said converter means comprising a plurality of shutters cooperatively associated with said fixed air guide means and movable to selectively control air flow through said outer air flow passages so as to effect impingement of said high velocity air with said converter means.

14. Apparatus as defined in claim 13 including a pair of cooperating movable shutters operatively associated with each of said outer air passages, said fixed air guide means including a toroidal flow guide member disposed generally centrally thereof, said shutters being selectively movable to positions cooperating with said toroidal air guide member to selectively close off said outer air passages in a manner to effect predetermined air flow to said converter means.

15. Apparatus as defined in claim 14 wherein said converter means comprises a turbine supported for rotation about a fixed axis centrally of said toroidal flow guide member, said shutters being cooperatively associated with said toroidal flow guide member in a manner to facilitate passage of high velocity air through said turbine in a predetermined direction therethrough.

16. A wind driven power apparatus comprising, in combination, first air guide means defining an air flow passage having an air entrance and an air exit, turbine means disposed within said air flow passage intermediate said air entrance and exit, means supporting said turbine means within said air flow passage for rotation in a plane substantially transverse to said air flow passage so that air passing through said air flow passage impinges said turbine means in a manner to effect rotation thereof, and stationary second air guide means peripherally of said first air guide means in close proximity thereto and defining a plurality of substantially horizontal air flow channels disposed circumferentially about said first air guide means, said air flow channels being adapted to increase the velocity of air flowing inwardly through the windwardly facing ones of said channels, said first air guide means being rotatable relative to said second air guide means so as to position said air entrance to receive air flow from at least one of said windwardly facing air flow channels and direct said air flow to impinge and rotate said turbine means, said air flow passage being adapted to direct the spent air from said turbine means through said air exit to at least one of the downwind facing air flow channels.

17. Apparatus as defined in claim 16 wherein said first air guide means comprises a cylindrical air guide block having said air flow passage formed therein so that said air entrance and air exit intersect the cylindrical peripheral surface thereof, said stationary second air guide means defining a cylindrical recess generally centrally thereof adapted to receive said air guide block, and including means supporting said air guide block within said cylindrical recess for rotation about the axis of said recess.

18. Apparatus as defined in claim 17 including means operatively associated with said air guide block for selectively rotating said air guide block relative to said second air guide means.

19. Apparatus as defined in claim 16 wherein said air flow passage includes a generally vertically directed portion disposed intermediate said air entrance and air exit, said means supporting said turbine means comprising a substantially vertical rotatable turbine shaft coaxial with the axis of rotation of said air guide block and supporting said turbine means within said vertically directed portion of said air flow passage, said air flow passage being adapted to increase the velocity of air entering said air entrance and passing to said turbine means.

20. Apparatus as defined in claim 5 including power generator means driven by said turbine shaft.

21. Apparatus as defined in claim 19 wherein said air flow passge downstream from said turbine means has greater volume than the volume of said air flow passage from said air entrance to said turbine means so as to accommodate the increased volume of reduced velocity air passing from said turbine means.

22. Apparatus as defined in claim 17 wherein said air entrance in said first air guide means is adapted to simultaneously receive air flowing inwardly from a plurality of said air channels, said air flow passage being adapted to further increase the velocity of air received in said air entrance as said air passes to said turbine means.

23. Apparatus as defined in claim 17 wherein said first air guide means includes an air vent communicating with said air flow passage downstream from said turbine means.

24. Apparatus as defined in claim 17 wherein said plurality of substantially horizontal air flow channels are of equal size and are defined by upper and lower outwardly diverging surfaces and radial circumferentially spaced vanes so as to define air flow channels converging in the direction toward said first air guide means.

* * * * *